United States Patent Office 3,468,820
Patented Sept. 23, 1969

3,468,820
PRODUCTION OF PARTICULATE EXPANDABLE STYRENE POLYMERS
Karl Buchholz, Ludwigshafen (Rhine), Erhard Stahnecker, Ziegelhausen, and Johannes Grohmann and Rolf Moeller, Ludwigshafen (Rhine), Germany, assignors to Badische Anilin- & Soda-Fabrik Aktiengesellschaft, Ludwigshafen am Rhine, Germany
No Drawing. Filed Jan. 10, 1966, Ser. No. 519,439
Claims priority, application Germany, Jan. 16, 1965, B 80,144
Int. Cl. C08f 1/11, 7/04, 19/02
U.S. Cl. 260—2.5          8 Claims

ABSTRACT OF THE DISCLOSURE

Particulate expanded styrene polymers which are capable of being processed into foam plastics having a finely cellular structure are prepared by polymerizing styrene with or without any other olefinically unsaturated monomeric compounds in aqueous suspension in the presence of an expanding agent and in the presence of 0.001 to 1% by weight (on the monomers) of a water insoluble high molecular weight polymer of a vinyl ester, vinyl ether, acrylic ester, or methacrylic ester which will dissolve in the monomers but is not homogeneously miscible with the polymer obtained.

---

This invention relates to a process for the production of expandable styrene polymers which may be processed into foam plastics having a finely cellular structure.

It is known that moldings of expanded styrene polymers are obtained when particulate styrene polymers which contain a gaseous or liquid expanding agent are heated in molds (which when closed are not gastight) to temperatures above the boiling point of the expanding agent and the softening point of the polymer. Moldings of expanded styrene polymers of this type have closed cells.

In practice foam materials are often desired whose cells are as small as possible and of uniform size. Such materials have outstanding insulating properties and moreover a pleasing surface and this is of particular importance in the production of decorative articles, as for example ceiling boards. Foams having relatively coarse cells and nonuniform structure are however often obtained from expandable styrene polymers.

Attempts have already been made to obtain foams having uniform and finely cellular structure by appropriate choice of the expanding agent or mixtures of expanding agents. In most cases however the results achieved have been inadequate. Attempts have also been made to obtain molded articles having uniform and finely cellular structure by adding small amounts of solvents, as for example ethers, ketones, halohydrocarbons, aromatic hydrocarbons and the like to the expanding agent. It has been found however that moldings prepared from such expandable polymers have a tendency to shrink.

We have now found that particulate expandable styrene polymers having particularly advantageous properties can be prepared by polymerizing styrene with or without other olefinically unsaturated monomeric compounds in aqueous suspension in the presence of an expanding agent, by polymerizing the monomers in the presence of 0.001 to 1% by weight (on the monomers) of a water-insoluble high molecular weight polymer of a vinyl ester, vinyl ether, acrylic ester or methacrylic ester which will dissolve in the monomers and which is not homogeneously miscible with the polymer obtained.

Foam plastics prepared from the expandable styrene polymers according to this invention have particularly fine and uniform cells. The particles in the plastic are fused together well. The articles may be taken out from the molds in which they have been prepared after a relatively short cooling time.

Styrene may be polymerized alone or mixed with other monomeric polymerizable compounds. Mixtures of monomers should contain at least 50% by weight of styrene. Examples of suitable comonomers are nuclear halostyrenes, nuclear methylstyrenes, α-methylstyrene, acrylonitrile, methacrylonitrile, esters of acrylic or methacrylic acid with alcohols having one to eight carbon atoms, vinyl esters or vinylcarbazole, or small amounts, for example 0.001 to 0.1% by weight (on the monomers) of a crosslinkable monomer such as divinylbenzene or 1,4-butanediol diacrylate.

Polymerization of the monomers in aqueous suspension is carried out under conventional conditions. Suitable methods are described for example in the book "Rigid Plastic Foams," by T. N. Ferrigno, Reinhold Publishing Corporation, N.Y., 140/141 (1963).

The expanding agents contained in the styrene polymers are normally gaseous or liquid hydrocarbons or halohydrocarbons which do not dissolve the styrene polymer and which have boiling points below the softening point of the polymer. Expanding agents whose boiling point is from 35° to 100° C. are particularly suitable. Examples of particularly suitable expanding agents are aliphatic hydrocarbons having three to six carbon atoms inclusive, such as propane, butane, pentane, hexane, cyclohexane, or chloro-fluoro carbon compounds having one or more carbon atoms and dichlorodifluoromethane. The expanding agent may be contained in the expandable material in an amount of from 2 to 10 by weight (on the polymer).

The high molecular weight compounds in whose presence the polymerization of the styrene or mixture of styrene with other monomers is carried out, should be insoluble in water because under the conditions of suspension polymerization compounds which are soluble in water will disperse in the aqueous phase and not in the polymer particles obtained. The high molecular weight compounds should moreover be soluble in the monomers. Soluble compounds for the purposes of the present invention include those which swell but do not completely dissolve in the monomers. Moreover the high molecular weight compounds should have the property of not being homogeneously miscible with the styrene polymers obtained, i.e., these compounds should be incompatible with the styrene polymers, i.e., will not form a homogeneous phase. The solidified polymer melt contains the embedded high molecular compound in a state of fine dispersion. The compounds are the more effective the more incompatible they are with the styrene polymers.

The high molecular weight substances are contained in the monomer mixture in amounts of 0.001 to 1% by weight, preferably 0.05 to 0.1% by weight.

The polymers of vinyl esters, vinyl ethers, acrylic esters or methacrylic esters include homopolymers of these monomers, copolymers of these monomers with one another and copolymers of one or more of these monomers with other monomers, the units of the latter monomers being not more than 50% by weight. Suitable high molecular weight polymers are those from monomers having the general formula:

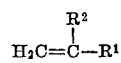

in which R¹ may denote

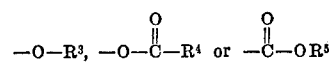

and R² may denote hydrogen or, when R¹ denotes

may denote —CH₃. R³, R⁴ and R⁵ denote aliphatic hydrocarbon radicals having one to eight carbon atoms inclusive.

Examples of suitable compounds are polymers of vinyl methyl ether, vinyl ethyl ether or vinyl isobutyl ether; vinyl acetate or vinyl propionate polymers; polymers of acrylic or methacrylic esters with alcohols having one to six carbon atoms. High molecular weight polymers include those whose molecular weights are for example from 10,000 to 1,000,000.

Other substances, such as flame retardants, for example tris(2,3-dibromopropyl)phosphate or 1,2,5,6,9,10-hexabromocyclododecane, and also fillers, plasticizers or antistatics, may also be present in the monomeric styrene or in the mixture of monomers.

The invention is illustrated by the following examples in which the parts specified are parts by weight.

Example 1

Batches of 20,000 parts of water, 32 parts of a copolymer of 95 parts of N-vinylpyrrolidone and 5 parts of methyl acrylate having a K-value of 75, 10 parts of sodium pyrophosphate, 10,000-x-parts of styrene, x parts of a high polymeric substance, 35 parts of benzoyl peroxide and 700 parts of pentane are introduced into a vessel which is resistant to pressure and contains a flat blade paddle agitator. Mixtures of 200 parts of hexane with 500 parts of butane or propane, or 750 parts of dichlorodifluoromethane may be used instead of pentane.

In the various batches, x denotes:

(a) nil, i.e. no addition;
(b) 10 parts of polyvinyl isobutyl ether, molecular weight 50,000;
(c) 10 parts of polymethyl acrylate, molecular weight 50,000;
(d) 10 parts of poly-2-ethylhexyl acrylate, molecular weight 12,000;
(e) 10 parts of polymethyl methacrylate, molecular weight 30,000;
(f) 5 parts of polyvinyl acetate, molecular weight 60,000;
(g) 10 parts of a copolymer of 50 parts of butyl acrylate and 50 parts of vinyl acetate;
(h) 10 parts of a polyethyl acrylate, molecular weight 100,000;
(i) 5 parts of polyvinyl propionate.

Each batch is kept for twenty hours at 70° C. and fifteen hours at 85° C. at the same rate of stirring. Particulate expandable compositions are obtained in bead form, which are washed and dried.

The expandable compositions are preexpanded in flowing steam at 105° C. to a bulk density of 20 g./l., stored for twenty-four hours and then molded in a perforated mold having the dimension 50 x 100 x 100 cm. with steam at 0.8 atmosphere gauge which is allowed to act for ten seconds, to form blocks.

In the following table, the degree of fusion (D) during preexpansion, the quality (Q) of the fusion of the foam in the finished block, the cellular structure (mean cell size in mm. (M) and range of variation (R) in cell size) and the cooling time (C) in minutes required for the blocks are reproduced.

TABLE

| Batch | D | Q, percent | M | R | C |
|---|---|---|---|---|---|
| (a) | 3 | 95 | 0.22 | 0.15-0.30 | 75 |
| (b) | 1 | 95 | 0.06 | 0.05-0.07 | 70 |
| (c) | 0 | 95 | 0.06 | 0.05-0.07 | 60 |
| (d) | 0-1 | 95 | 0.12 | 0.10-0.14 | 60 |
| (e) | 0-1 | 95 | 0.08 | 0.07-0.09 | 50 |
| (f) | 0 | 95 | 0.12 | 0.11-0.13 | 60 |
| (g) | 0-1 | 95 | 0.14 | 0.12-0.16 | 65 |
| (h) | 0-1 | 95 | 0.10 | 0.09-0.11 | 55 |
| (i) | 0-1 | 95 | 0.08 | 0.07-0.09 | 60 |

The degree of fusion indicates the following condition of the preexpanded beads:

0=no fusion
1=slight fusion; the particles which are fused together may easily be separated by pressure with a flat hand;
2=slightly stronger fusion; the fused particles can be separated by hand without damage;
3=strong fusion; the particles are partly damaged in the attempt to separate them from each other.

To determine the quality of fusion in the block, the block is broken and the percentage proportion of particles which are fused together is determined.

The cooling time is the period which elapses between molding and the point of time at which the resultant block can be removed from the mold without subsequent deformation of the block taking place.

Example 2

In the manner described in Example 1, 9,000 parts of styrene and 1,000 parts of acrylonitrile are polymerized with 35 parts of benzoyl peroxide in the presence of 10 parts of polyvinyl propionate or 10 parts of a copolymer of 50% by weight of butyl acrylate and 50% by weight of vinyl acetate, and 700 parts of pentane.

The beads of polymer obtained are preexpanded in each case in the way described in Example 1 and processed into molded articles.

The molded articles have a particularly fine cellular structure as compared with those prepared from beads which contain no high molecular weight polymer. The molding may be removed from the mold after a relatively short cooling time.

Expandable styrene polymers may be obtained in the same way from styrene mixed with 5% by weight of methyl methacrylate or p-chlorostyrene; they have the same favorable properties as the expandable polymers described above.

We claim:

1. A process for the production of particulate expandable styrene polymers which are capable of being processed into foam plastics having a finely cellular structure which comprises polymerizing styrene in aqueous suspension in the presence of an expanding agent and 0.001 to 1% by weight on the monomers of a water insoluble high molecular weight polymer which will dissolve in the monomers and which is not homogeneously miscible with the styrene polymer obtained, said water insoluble high molecular weight polymer having a molecular weight within the range of 10,000 to 1,000,000 and containing at least 50% by weight of units of a monomer having the general formula

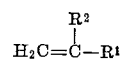

in which R¹ denotes

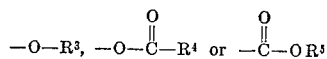

and R² may denote hydrogen or, when R¹ denotes

may denote —CH₃, R³, R⁴ and R⁵ being aliphatic hydrocarbon radicals having one to eight carbon atoms.

2. A process as claimed in claim 1 wherein a mixture of styrene and other olefinically unsaturated monomeric polymerizable compounds containing at least 50% by weight styrene is polymerized.

3. A process as claimed in claim 1 wherein 0.05 to 0.1% by weight (on the monomers) of the high molecular weight water-insoluble polymer is used.

4. A process as claimed in claim 2 wherein 0.05 to 0.1% by weight (on the monomers) of the high molecular weight water-insoluble polymer is used.

5. A process as claimed in claim 1 wherein the monomers are polymerized in the presence of polyvinylpropionate.

6. A process as claimed in claim 1 wherein the monomers are polymerized in the presence of polyvinylisobutylene ether.

7. A process as claimed in claim 2 wherein the monomers are polymerized in the presence of polyvinylpropionate.

8. A process as claimed in claim 2 wherein the monomers are polymerized in the presence of polyvinylisobutyl ether.

References Cited

UNITED STATES PATENTS

| 2,886,552 | 5/1959 | Heiligmann et al. | 260—884 |
| 2,888,410 | 5/1959 | Buchholtz | 260—2.5 |
| 2,957,857 | 10/1960 | Martin | 260—884 |
| 2,983,692 | 5/1961 | D'Alelio | 260—2.5 |
| 3,001,954 | 9/1961 | Buchholtz et al. | 260—2.5 |
| 3,051,682 | 8/1962 | Ott. | |
| 3,186,975 | 6/1965 | Harris. | |

SAMUEL H. BLECH, Primary Examiner

M. FOELAK, Assistant Examiner

U.S. Cl. X.R.

260—45.7, 86.7, 88.2, 93.5, 886, 885